(12) United States Patent  (10) Patent No.: US 6,606,831 B2
Degelsegger  (45) Date of Patent: Aug. 19, 2003

(54) FIRE RATED DOOR AND FIRE RATED WINDOW

(75) Inventor: Walter Degelsegger, Desselbrunn (DE)

(73) Assignee: Dorma GmbH + Co., KG, Ennepetal (DE)

( * ) Notice: Subject to any disclaimer, the term of this patent is extended or adjusted under 35 U.S.C. 154(b) by 0 days.

(21) Appl. No.: 09/812,974

(22) Filed: Mar. 20, 2001

(65) Prior Publication Data

US 2001/0018814 A1 Sep. 6, 2001

Related U.S. Application Data

(63) Continuation-in-part of application No. PCT/EP00/06893, filed on Jul. 19, 2000.

(30) Foreign Application Priority Data

Jul. 21, 1999 (DE) .......................................... 199 33 408

(51) Int. Cl.⁷ ................................................. E04B 1/04
(52) U.S. Cl. ..................... 52/204.1; 52/232; 52/784.11; 52/784.13; 52/787.11
(58) Field of Search ......................... 52/204.1, 204.543, 52/204.545, 205, 204.6, 232, 783.12, 783.13, 784.1, 784.11, 656.3, 656.4, 656.5, 656.7, 784.12, 784.13, 786.1, 786.11, 787.11; 49/501, 504

(56) References Cited

U.S. PATENT DOCUMENTS

| 4,027,443 | A | * | 6/1977 | Briggs ........................ 156/109 |
| 4,164,108 | A | * | 8/1979 | Ortmanns ..................... 52/232 |
| 4,203,264 | A | * | 5/1980 | Kiefer et al. ..................... 52/1 |
| 4,307,543 | A | * | 12/1981 | Schulthess ................... 49/501 |
| 4,601,143 | A | * | 7/1986 | O'Keefe et al. ............ 52/171.3 |
| 4,604,840 | A | * | 8/1986 | Mondon ....................... 52/172 |
| 4,850,173 | A | * | 7/1989 | Beyer et al. ................... 52/232 |
| 5,038,537 | A | * | 8/1991 | Frambach ..................... 49/400 |
| 5,244,709 | A | * | 9/1993 | Vanderstukken ............. 156/101 |
| 5,347,780 | A | * | 9/1994 | Richards et al. .............. 49/504 |
| 5,355,625 | A | * | 10/1994 | Matsuoka ..................... 49/381 |
| 5,496,640 | A | * | 3/1996 | Bolton et al. ................ 428/220 |
| 5,544,456 | A | * | 8/1996 | Dries ........................... 49/383 |
| 5,551,195 | A | * | 9/1996 | Vanderstukken ............. 428/332 |
| 5,687,532 | A | * | 11/1997 | Torrey .......................... 49/504 |
| 6,327,826 | B1 | * | 12/2001 | Mann ............................. 52/1 |

FOREIGN PATENT DOCUMENTS

| DE | 2742665 | 3/1978 | | |
| DE | 2645259 | 4/1978 | | |
| DE | 19543148 | 5/1997 | | |
| EP | 0278711 | 8/1988 | | |
| EP | 0401555 | 12/1990 | | |
| EP | 0444393 | 9/1991 | | |
| EP | 0612910 | 8/1994 | | |
| EP | 1020605 | 7/2000 | | |
| FR | 2651270 | 3/1991 | | |
| GB | 2056535 A | * | 3/1981 | ............. E06B/5/16 |
| GB | 2309728 | 8/1997 | | |
| JP | 408284544 A | * | 10/1996 | ............. E06B/5/16 |
| JP | 409177444 A | * | 7/1997 | ............. E06B/5/16 |
| WO | 9920867 | 4/1999 | | |

* cited by examiner

Primary Examiner—Carl D. Friedman
Assistant Examiner—Brian E. Glessner
(74) Attorney, Agent, or Firm—Nils H. Ljungman & Associates

(57) ABSTRACT

Fire rated door or fire rated window to prevent the spread of smoke and fire which is suitable for use in the region of a fire protection partition, said fire rated door or fire rated window comprises a mobile frame with a filling compartment consisting of fire resisting material, and the mobile frame is partially or completely surrounded by a stationary frame component.

10 Claims, 8 Drawing Sheets

FIRE RATED DOOR AND FIRE RATED WINDOW

CONTINUING APPLICATION DATA

This application is a Continuation-In-Part application of International Patent Application No. PCT/EP00/06193, filed on Jul. 19, 2000, which claims priority from Federal Republic of Germany Patent Application No. 199 33 408.0, filed on Jul. 21, 1999. International Application No. PCT/EP00/06893 was pending as of the filing date of this application. The United States was an elected state in International Application No. PCT/EP00/06893.

BACKGROUND OF THE INVENTION

1. Field of the Invention

The present invention relates to a fire rated door or a fire rated window.

More specifically the present invention relates to a fire rated door or a fire rated window which are installed in fire protection partitions, or a similar structure, to prevent or inhibit the spread of smoke and fire; said fire rated door or fire rated window comprises a mobile frame with its filling compartment which consists of a fire resistant material, and the mobile frame is partially or completely enclosed by a stationary frame component

2. Background Information

This fire rated door type is for example disclosed by European Patent Application No. 0 401 555 A2, where a glass pane is mounted in a metal frame equipped with a surrounding groove. In this case, the glass pane ends before the frame and is connected with the metal frame by means of additional metal edge strips serving as compensating adapters. The metal strips are glued with traditional fire rated glue for example made on water-glass base.

European Patent Application No. 0 612 910 A2 displays a closing ledge for metal doors, which ledge, to increase stability in the lower part, is pressed between two protruding legs.

A door frame profile for fire rated doors is disclosed by European Patent Application No. 0 444 393 A21 where a glass pane is retained in a strong door frame profile. The door frame profile is executed as hollow section and it presents, inserted into its chambers, fire rated plates that guarantee the fire resistance of such door A fire-resistant glazing is described in Federal Republic of Germany Patent Application No. 236 45 259 A1. In this case, silicate glass panes made from tempered glass are used on the one side, and a reinforced silicate glass pane is used on the other side of an intermediate air gap. The construction of such fire-resistant glazing is realized by means of a metal frame embracing and overlapping the border edge Federal Republic of Germany Patent Application No. 297 42 665 A1 reveals a fire retarding swing door or center pivoted door where the door frame respectively the borders of the door leaves present a thermal insulation material, extending over the entire length respectively the entire width. This thermal insulation material will expand when heat develops, such that in the event of fire, the door component includes a secure fire barrier. This door is composed of plane material, which is not transparent and, in a partial section, is interrupted by a window to be mounted.

OBJECT OF THE INVENTION

The object of the invention is to conceive a fire rated door or a fire rated window abandoning the materials conventionally used for fire protection purposes, like light metal, wood or steel, and to manufacture said construction units at reduced cost.

SUMMARY OF THE INVENTION

The invention teaches that the foregoing object can be accomplished by a fire rated glass door assembly configured to inhibit the spread of fire and smoke in the region of a wall of a building, said fire rated glass door assembly comprising a fire protection partition of a building; a door jamb; said door jamb comprising a substantially contiguous and unitary frame structure; said door jamb being configured to be disposed in stationary manner in said fire protection partition of a building; said door jamb comprising a material to provide said door jamb with a fire rating and thus with the capability to withstand fire a predetermined time with a predetermined fire temperature on the fire exposed side of said door jamb and a predetermined maximum temperature on the non-fire exposed side of said door jamb; at least one door leaf; sad at least one door leaf comprising a glass pane to provide said at least one door leaf with a fire rating and thus with the capability to withstand fire a predetermined time with a predetermined fire temperature on the fire exposed side of said door leaf and a predetermined maximum temperature on the non-fire exposed side of said door leaf; said at least one door leaf comprising a substantially contiguous and unitary frame structure; said at least one door leaf being configured and disposed to be mobile in reference to said fire protection partition of a building; said at least one door leaf being disposed, upon assembly, to be at least partially enclosed by said door jamb; at least said door leaf comprising a first side and a second side to form a compartment therebetween; said compartment extending over a substantial portion of said door leaf; and a material being disposed in said compartment; said material in said compartment comprising a flowable material to impart to said door assembly a fire rating and thus with the capability to withstand fire a predetermined time with a predetermined fire temperature on the fire exposed side of said door assembly and a predetermined maximum temperature on the non-fire exposed side of said door assembly to thus enhance the fire rating capability of said fire rated door assembly to withstand fire and smoke.

The invention also teaches that this object can be accomplished by a fire rated door assembly configured to inhibit the spread of fire and smoke in the region of a wall of a building, said door assembly comprising: a door jamb; said door jamb being configured to be disposed in stationary manner in a wall of a building; said door jamb being comprising a material to provide said door jamb with a fire rating and thus with the capability to withstand fire a predetermined time with a predetermined fire temperature on the fire exposed side of said door jamb and a predetermined maximum temperature on the non-fire exposed side of said door jamb; at least one door leaf; said at least one door leaf comprising a material to provide said at least one door leaf with a fire rating and thus with the capability to withstand fire a predetermined time with a predetermined fire temperature on the fire exposed side of said door leaf and a predetermined maximum temperature on the non-fire exposed side of said door leaf; said at least one door leaf being configured and disposed to be mobile in reference to a wall of a building; said at least one door leaf being disposed to be at least partially enclosed by said door jamb; at least said door leaf being configured with a first and second side to form a compartment therebetween; said compartment extending over a substantial portion of said door leaf; and a material disposed in said compartment; said material in said compartment comprising a flawable material to impart to said door assembly the capability to withstand fire a predetermined ti with a predetermined fire temperature on the fire exposed side of said door assembly and a predetermined maximum temperature on the non-fire exposed side of said door assembly to thus enhance the fire rating capability of said fire rated door assembly to withstand fire and smoke.

The invention further teaches that this object is also accomplished by a fire rated window assembly configured to inhibit the spread of fire and smoke in the region of a wall of a building, said fire rated window assembly comprising: a first glass pane; said first glass pane comprising a material to provide said window assembly with a fire rating and thus with the capability to withstand fire a predetermined time with a predetermined fire temperature on the fire exposed side of said window assembly and a predetermined maximum temperature on the non-fire exposed side of said window assembly; a second glass pane; said second glass pane comprising a material to provide said window assembly with a fire rating and thus with the capability to withstand fire a predetermined tie with a predetermined fire temperature on the fire exposed side of said window assembly and a predetermined temperature on the non-fire exposed side of sad window assembly; said first and second glass panes comprising a first side and a second side to form a compartment therebetween; said compartment extending over a substantial portion of said window assembly; and a fire resistant material being disposed in said compartment; said fire resistant material comprising a material to impart to said window assembly a fire rating and thus with the capability to withstand fire a predetermined time with a predetermined fire temperature on the fire exposed side of said window assembly and a predetermined maximum temperature an the non-fire exposed side of said window assembly to thus enhance the fire rating capability of said window assembly to withstand fire and smoke. The fire rated door and the fire rated window in accordance with one embodiment of the invention may possibly comprise a fire resistant plastic/or synthetic material.

The dependent claims present further embodiments of the inventive idea.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Hereinafter, the invention is explained on the basis of different diagrammatically represented embodiment examples. It shows:.

DESCRIPTION OF THE PREFERRED EMBODIMENT

Figure 1:
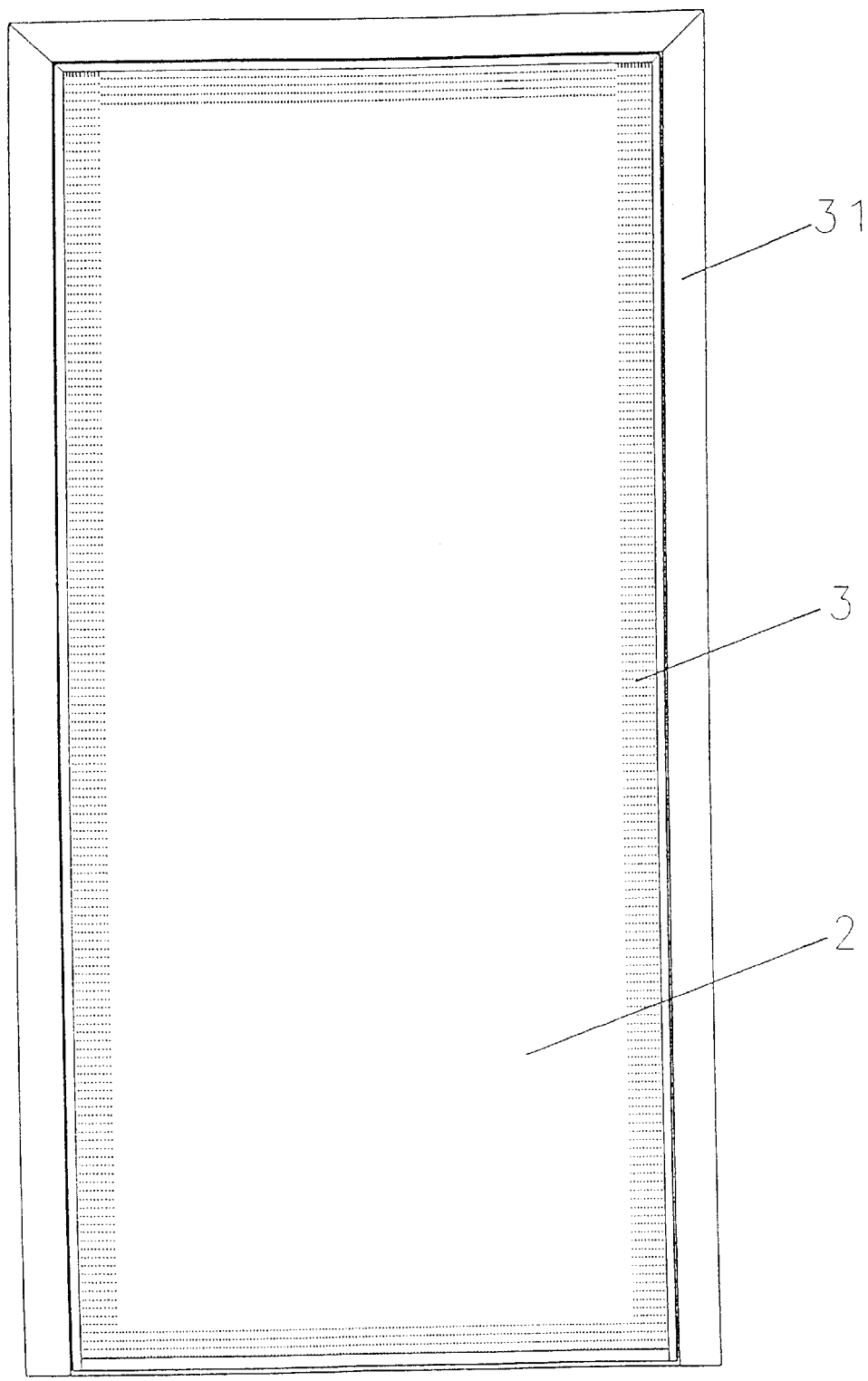
FIG. 1: a view of a single leaf fire rated door.

It is therefore proposed to manufacture the mobile as well as the stationary door frame of a fire rated door or of a fire rated window with profiles made from a fire resistant plastic material. Fire rated doors and windows are installed into fire rated walls and in the event of danger, serve the purpose to stop the spread of a fire and also of smoke. For this reason, fire rated doors and fire rated windows are classified according to corresponding fire rating classes. These individual fire-rating classes are organised according to the time the individual construction units will resist to a fire. The profiles, no matter whether they are solid profiles or hollow profiles with different cavities, are preferably arranged to build frames used for fire rated doors or fire rated windows. Either a multilayer glass pane, generally used as fire rated glass pane with correspondingly arranged fire protection layers, which will absorb the thermal radiation due to the heat development, or a fire resistant plastic material composed as plane material, can be employed as filling compartment within the frame.

According to the invention it is also conceivable, to manufacture the frame and the filling compartment as a single piece in mouldings. Likewise in case of a low fire rating class, a fire rated door or a fire rated window may be arranged in that the frame manufactured from plastic is embedded between two glass panes. In this case, the spaced glass panes can extend as far as to the exterior border of the mobile frame. In case a higher fire rating class is chosen, a transparent fire protection material can be introduced between the spaced glass panes. This fire protection material can consist of a fire rated glass pane as described before or also of a liquid fire protection gel.

The fire resistant plastic material consists of a support material in form of endless glass fiber rovings arranged in axial direction of the profile. This "raw profile" is moreover reinforced in radial direction with an additional glass fiber complex. For this purpose, the glass fibers are impregnated with a resin matrix and hardened in a moulding that corresponds to the profile's form. The moulding is in this case heated to ensure a faster manufacturing process.

The employed resin matrix basically consists of unsaturated polyester resins including appropriate hardeners, accelerators, additives and this is the most important, fire retarding fillers. Corresponding colours are added in form of colour pastes to achieve an adaptation to the aesthetics of existing buildings. Such fire rated doors can be executed as sliding doors, as well as single leaf or double feat doors with or without rebate. As the production of such profile forms is almost without limits, it is also possible to combine corresponding profiles.

With corresponding design, such mobile frame can also be manufactured from fire resistant plastic material as stationary frame. If hollow profiles are used, they can be filled partially or completely with fire protection material.

One feature of the invention resides broadly in a fire rated door or fire rated window to prevent the spread of smoke and fire, suitable for use in the region of a fire protection partition, said fire rated door or fire rated window comprises a mobile frame with its filling compartment which consists of a fire resistant material, and the mobile frame is partially or completely enclosed by a stationary frame component, characterised in that the fire rated door and the fire rated window consist of a fire resistant plastic material.

Yet another feature of the invention resides broadly in a fire rated door or fire rated window characterised in that the mobile frame and the stationary frame are manufactured from profiles.

Still another feature of the invention resides broadly in a fire rated door or fire rated window characterised in that the filling compartment of the mobile frame partially or completely consists of fire resistant plastic material.

A further feature of the invention resides broadly in a fire rated door or fire rated window characterised in that the filling compartment and the mobile frame consist of one single piece.

Another feature of the invention resides broadly in a fire rated door or fire rated window characterised in that the filling compartment of the mobile frame completely or partially consists of a fire rated glass pane.

Still another feature of the invention resides broadly in a fire rated door or fire rated window characterised in that the mobile frame is embedded between two spaced glass panes.

Yet another feature of the invention resides broadly in a fire rated door or fire rated window characterised in that the glass panes extend as far as to the exterior edge of the frame.

A further feature of the invention resides broadly in a fire rated door or fire rated window characterised in that transparent fire protection material is included between the spaced glass panes.

Still another feature of the invention resides broadly in a fire rated door or fire rated window characterised in that the mobile and the stationary frame consist of solid material.

Yet another feature of the invention resides broadly in a fire rated door or fire rated window characterised in that the mobile and the stationary frame consist of hollow profiles.

Another feature of the invention reside broadly in a fire rated door or fire rated window characterised in that the hollow profiles are completely or partially filled with a fire protection material.

Still another feature of the invention resides broadly in a fire rated door or fire rated window characterised in that the fire rated material is a fire protection glass pane.

Yet another feature of the invention resides broadly in a fire rated door or fire rated window characterised in that the fire rated material is a fire protection gel.

A further feature of the invention resides broadly in a fire rated door or fire rated window characterised in that the plastic material is a glass fiber reinforced plastic material.

Another feature of the invention resides broadly in a fire rated door or fire rated window characterised in that glass fiber rovings, which are arranged in axial direction, are used as the support material in the plastic material.

Still another feature of the invention resides broadly in a fire rated door or fire rated window characterized in that the plastic profiles in radial direction are reinforced with a glass fiber complex, said glass fibers are impregnated with a resin matrix and hardened in a heated moulding.

Yet another feature of the invention resides broadly in a fire rated door or fire rated window characterised in that the resin matrix basically consists of unsaturated polyester resin, hardener, accelerator, additives, colour pastes and fire retarding fillers.

A further feature of the invention resides broadly in a fire rated door or fire rated window characterized in that the fire rated door is a single leaf or double leaf door.

Yet another feature of the invention resides broadly in a fire rated door or fire rated window characterised in that the fire rated door is a sliding door.

The corresponding foreign and international patent publication applications, namely, Federal Republic of Germany Patent Application No. 199 33 408.0, filed on Jul. 21, 1999, having inventor Walter DEGELSEGGER, and International Application No. PCT/EP00/06893, filed on Jul. 19, 2000, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/813,193, filed on Mar. 20, 2001, having the inventor Walter DEGELSEGGER, and claiming priority from Federal Republic: of Germany Patent Application No. 199 33 410.2, which was filed on Jul. 21, 1999 and International Patent Application PCT/EP 00/06884, which was filed on Jul. 19, 2000 as well as their published equivalents, and other equivalents or corresponding applications, if any, an corresponding cases in the Federal Republic of Germany and elsewhere, and the references cited in any of the documents cited herein, are hereby incorporated by reference as if set forth in their entirety herein.

U.S. patent application Ser. No. 08/813,186, filed on Mar. 20, 2001, having the inventor Walter DEGELSEGGER, and claiming priority from Federal Republic of Germany Patent Application No. 199 33 400.5, which was filed an Jul. 21, 1999 and International Patent Application PCT/EP00/ 06888, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. patent application Ser. No. 09/812,424, filed on Mar. 20, 2001, having the inventor Walter DEGELSEGGER, and claiming priority from Federal Republic of Germany Patent Application No. 199 33 406.4, which was filed on Jul. 21, 1999 and International Patent Application PCT/EP00/ 06886, which was filed on Jul. 19, 2000 as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following standards or codes, namely: ASTM D 523 entitled "Standard Test Method for Specular Gloss"; ASTM D635 entitled "Standard Test Method for Rate of Burning and/or Extent of and Time of Burning of Self-supporting Plastics in a Horizontal Position"; ASTM E 84 entitled "Standard Test Method for Surface Burning Characteristics of Building Materials"; ASTM E 152 entitled "Standard Methods of Fire Tests of Door Assemblies"; NFPA 252 entitled "Standard Methods of Fire Tests of Door Assemblies"; and UL 10B entitled "Standard for Fire Tests of Door Assemblies", are hereby incorporated by reference as if set forth in their entirety herein.

The terms fire rated, fire resistant, fire protection, and flame retardant are used herein interchangeably.

The term fire protection laminate or the like terminology is to mean, inter alia, a seal or similar structure made of intumescent material that expands in the event of a predetermined temperature or heat of fire. This expanded structure will then serve to seal off the space of a corresponding gap, say between a door jamb and a door leaf, to thereby enhance the fire rated capability of the fire rated door, and a fire rated window.

Some examples of fire resistant plastic, or polymeric or plastic/synthetic, materials which may possibly be incorporated in an embodiment of the present invention are to be found in: U.S. Pat. No. 4,017,457 issued to Baron et al. on Apr. 12, 1977 and entitled "Flame retardant polycarbonate compositions"; U.S. Pat. No. 4,035,447 issued to T_noki et al. on Jul. 12, 1977 and entitled "Fire resistant polymer composition"; U.S. Pat. No. 4,101,498 issued to Snyder on Jul. 18, 1978 and entitled "Fire-resistant composition"; U.S. Pat. No. 5,444,809 issued to Aoki et al. on Aug. 22, 1995 and entitled "Flame retardant resin composition and flame retardant plastic optical fiber cable using the same"; U.S. Pat. No. 4,119,612 issued to Vollkommer et al. on Oct. 10, 1978 and entitled "Polymeric and oligomeric formals"; U.S. Pat. No. 4,650,823 issued to Krishnan et al. on Mar. 17, 1987 and entitled "Iron oxide pigmented, polycarbonate composition"; U.S. Pat. No. 5,276,077 issued to Schwane et al. on Jan. 4, 1994 and entitled "Ignition resistant carbonate polymer blends"; U.S. Pat. No. 5,298,299 issued to Shea on Mar. 29, 1994 and entitled "Double wall fire proof duct"; U.S. Pat. No. 5,326,805 issued to Sicken et al. on Jul. 5, 1994 and entitled "Flame-retardant plastics molding composition of improved stability"; U.S. Pat. No. 5,329,972 issued to Guiton on Jul. 19, 1994 and entitled "Fire resistant plastic structure"; U.S. Pat. No. 5,444,809 issued to Aoki et al. on Aug. 22, 1995 and entitled "Flame retardant resin composition and flame retardant plastic optical fiber cable using the same"; U.S. Pat. No. 5,571,889 issued to Cheng et al. on Nov. 5, 1996 and entitled "Process for preparing flame-retardant phosphorous-containing unsaturated polyester"; and U.S. Pat. No. 6,110,559 issued to De Keyser an Aug. 29, 2000 and entitled "Plastic article having flame retardant properties", all of these U.S. patents being hereby expressly incorporated by reference as if set forth in their entirety herein.

Some examples of fire resistant materials which possibly may be incorporated in an embodiment of the present invention are to be found in: U.S. Pat. No. 3,983,082 issued to Pratt et al. on Sep. 28, 1976 and entitled "Intumescent fire retardant material and article"; U.S. Pat. No. 4,052,526 issued to Pratt et al. on Oct. 4, 1977 and entitled "Intumescent fire retardant material and article"; U.S. Pat. No. 4,065,394 issued to Pratt et al. on Dec. 27, 1977 and entitled "Intumescent fire retardant material"; U.S. Pat. No. 4,235,836 issued to Wassell et al. on Nov. 25, 1980 and entitled "Method for making thermal insulating, fire resistant material"; U.S. Pat. No. 4,246,358 issued to Ellard on Jan. 20, 1981 and entitled "Fire-resistant material and process"; U.S. Pat. No. 4,265,317 issued to Knecht on May 5, 1981 and entitled "Fire resistant material"; U.S. Pat. No. 4,810,741 issued to Kim and entitled "Fire-resistant material, noncombustible material for treating interior building material and processes for their production"; U.S. Pat. No. 5,401,793 issued to Kobayashi et al. on Mar. 28, 1995 and entitled "Intumescent fire-resistant coating, fire-resistant material, and processes for producing the fire-resistant material"; U.S. Pat. No. 6,001,285 issued to Wunram on Dec. 14, 1999 and entitled "Fire-retardant material and a method for the manufacture of such a material"; and U.S. Pat. No. 6,159,878 issued to Marsh on Dec. 12, 2000 and entitled "Layered reflecting and photoluminous fire resistant material", all of these U.S. patents being hereby expressly incorporated by reference as if set forth in their entirety herein.

Some examples of fire retardant fillers which possibly may be incorporated in an embodiment of the present invention are to be found in: U.S. Pat. No. 4,254,177 issued to Fulmer on Mar. 3, 1981 and entitled "Fire-retardant product and method of making"; U.S. Pat. No. 4,391,924 issued to Uram, Jr. on Jul. 5, 1983 and entitled "High temperature thermobarrier compositions"; U.S. Pat. No. 4,619,954 issued to Warner, II on Oct. 28, 1986 and entitled "Fiberglass reinforced plastic sheet material with fire retardant filler"; U.S. Pat. No. 4,746,565 issued to Bafford et al. on May 24, 1988 and entitled "Fire barrier fabrics", U.S. Pat. No. 4,839,222 issued to Jain on Jun. 13, 1989 and entitled "Fiberglass insulation coated with a heat collapsible foam composition"; U.S. Pat. No. 5,039,718 issued to Ashley et al. on Aug. 13, 1991 and entitled "Fillers"; U.S. Pat. No. 5,279,894 issued to Hoffman et al. on Jan. 18, 1994 and entitled "Curable silicone compositions and non-flammable cured products obtained therefrom"; U.S. Pat. No. 5,378,539 issued to Chen on Jan. 3, 1995 and entitled "Cross-linked melt processible fire-retardant ethylene polymer compositions"; U.S. Pat. No. 5,474,602 issued to Brown et al. on Dec. 12, 1995 and entitled "Treatment of magnesium hydroxide and its use as plastics filler"; and U.S. Pat. No. 6,100,359 issued to Ghatan on Aug. 8, 2000 and entitled "Ablative polyurea foam and prepolymer", all of these U.S. patents being hereby expressly incorporated by reference as if set forth in their entirety herein.

This application is a Continuation-In-Part application of International Patent Application No. PCT/EP00/06886, filed on Jul. 19, 2000, which claims priority from Federal Republic of Germany Patent Application No. 199 33 406.4, filed on Jul. 21, 1999. International Application No. PCT/EP00/06886 was pending as of the filing date of the above-cited application. The United States was an elected state in International Application, No. PCT/EP00/06886.

The present invention relates to a fire rated door with a surrounding door frame, comprising a glass pane, which is embedded within its circumferential metal frame. In this application, inter alia, two glass panes are proposed for a fire rated door including a frame spacing apart the glass panes.

Today, fire rated doors are frequently executed as metal doors, the reason for said execution type are cost reduction effects.

Such fire rated door is for example disclosed by European Patent No.: 0 401 550 A2, where a glass pane is mounted within a metal frame equipped with a circumferential groove. In this case, the glass pane ends before the frame and is connected with tile metal frame by means of additional metal edge strips serving as compensating adapters. In this case, the metal strips are connected with traditional fire rated glue, for example made on water-glass base.

A door frame profile for fire rated doors is disclosed by European Patent No. 0 444 393 A2, where a glass pane is retained in a strong door frame profile. The door frame profile is executed as hollow section and it presents, inserted into its chambers, fire rated plates that guarantee the fire resistance of such a door.

A fire-resistant glazing is described in German Patent No. 296 45 259 A1. In this case, silicate glass panes made from tempered glass are used on the one side, and, on the other side of an intermediate air gap, a reinforced silicate glass pane is used. The construction of such fire-resistant glazing is realised by means of a metal frame embracing and overlapping the border edge.

German Patent No. 297 42 665 A1 reveals a fire retarding swing door or center pivoted door, where the door frame respectively the borders of the door leaves present a thermal insulative material, extending over the entire length respectively the entire width. This thermal insulative material will expand when heat develops, such that in the event of a fire, the door component includes a secure fire barrier. This door is composed of plane material, which is not transparent and, in a partial region, is interrupted by a window to be mounted.

As the above state-of-the-art shows, such technical designs today no longer match contemporary architecture. Today's goal is to give the impression that de-materialised transparent structures are used, which can no longer be achieved with the constructions known from the state-of-the-art and it is therefore the object of the invention to propose a solution realising the conception under economical aspects likewise of the region of the required fire protection partitions with its passageways, such that the observer does not notice that the present zone is actually a fire protection partition including a fire rated door. Simultaneously the solution of this task should include at the same time an increased safety feature aspect.

The present invention teaches that this object can be accomplished in that the fire rated door consists of at least one door leaf built from two glass panes spaced apart by means of profiles, said glass panes almost extending as far as to the border of the door leaf.

The dependent claims represent a further embodiment of the inventive idea.

It is proposed to conceive a fire rated door according to the principle of "structural glazing" such that the door leaf consists of spaced plane glass panes. The glass panes are spaced apart by means of an intermediate frame made from profiles. In this case, the glass panes extend as far as almost to the border of the door leaf, only the proper edges are protected from damage by a small overhang of the intermediate profiles. As this protection applies just to the edges, the whole area of the spaced glass panes is—free from any other material. In this case, a transparent fire protection medium is included between the spaced-glass panes. For example a fire rated gel or any other suitable transparent fire protection medium can be used as fire protection medium Depending on the fire rating class, it is however also possible to abandon the fire protection medium. Furthermore according to the inventive idea, it is possible to include, between both spaced exterior glass panes by means of corresponding spacers, a fire protection glass pane of the known type. To make the frame profiles, which are placed between the glass panes, invisible, the glass panes are provided with an enamelling on the interior side in the region where the profiles are placed. By doing so, the aspect of increased safety is respected, and the complete fire rated door is realised as transparent construction unit. Simultaneously, due to the fact that no profiles are visible, the complete appearance of said architectural structures as "structural glazing" is realised.

The profiles are preferably executed as solid profiles and can be manufactured from metal, plastic, steel or wood. In case of a fire rated door in plastic execution, a glass fiber reinforced plastic is preferably used. This plastic is composed such that endless glass fiber rovings oriented in axial direction are used in the plastic profiles. Simultaneously in radial direction, the profiles are reinforced with a glass fiber complex. These glass fibers are impregnated with a resin matrix and hardened within a heated mould. The resin matrix moreover includes fire-retarding fillers. Simultaneously appropriate fittings are incorporated within the profiles, likewise at the same time invisible for the observer. In order such door corresponds to fire protection requirements, so-called fire protection laminates in form of tapes are either incorporated into the profiles or they are also included within the door frame surrounding the fire rated door. Therefore, in the event of a fire, under the effect of heat development, the tapes will intumesce, which action simultaneously guarantees a tight barrier with regard to the source of the fire. According to the invention, such fire rated door is suitable for retrofitting. For this purpose, an existing jamb will be capped with corresponding fire resisting material, for example with gypsum plasterboards or likewise with corresponding additional profiles, which are executed such that two identical profiles are placed against each other over an existing jamb, and they are interconnected by means of an appropriate element, which may act at the same time as a fire protection laminate.

Such designed fire rated doors can also be executed as skylight above the door frame, and likewise as fixed side panels. Such execution of complete fire rated walls addresses the idea to create a de-materialised fire rated wall.

The proposed fire rated door can be manufactured as single action door (swing door) with a rebate, or as center-pivoted door. Besides the execution with a single leaf, likewise a double leaf execution with an inactive and an active leaf is possible. In case of an execution as single action door, one of the two spaced glass panes is larger than the other one, and a connection between them is guaranteed by means of a gradual profile.

Figure 2:
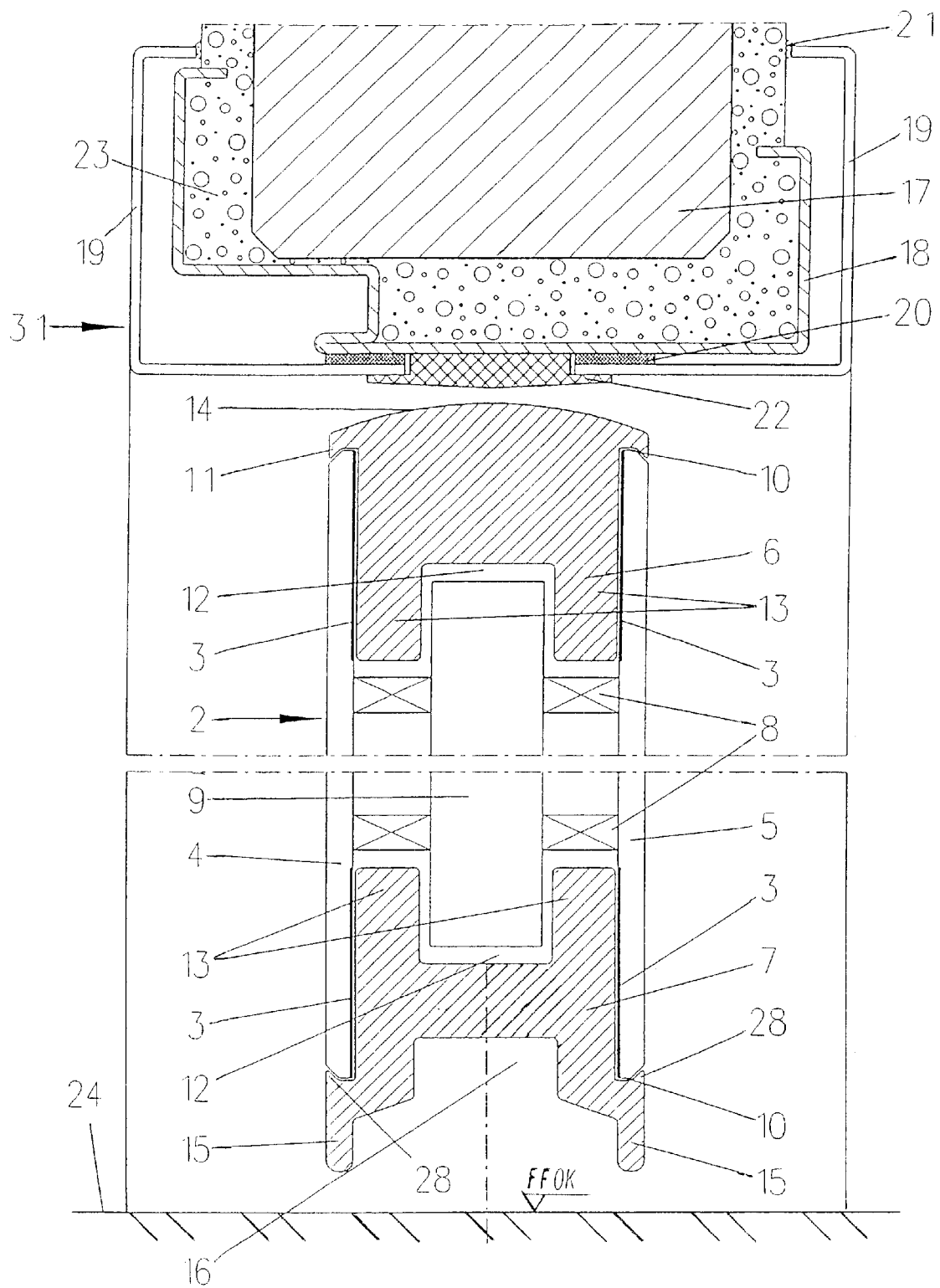
FIG. 2: a vertical section through a fire rated door according to FIG. 1.

FIG. 1 illustrates in a front view a fire rated door with a door leaf 2 and with a door frame 31 surrounding the door leaf. Reference numeral 3 identifies an enamelling on the glass panes 4 and 5 stretching alongside the edges of the door leaf 2. A vertical section of a single leaf door according to FIG. 1 is represented in FIG. 2. As here it is only question of the fire rated door's technical structure, all non-relevant parts have been omitted.

The door leaf 2 is composed as structural glazing, that means the door leaf 2 includes two glass panes 4 and 5, they are building quasi the entire door leaf. In the upper part, the glass panes 4 and 5 are spaced apart by means of a profile 6 and in the lower part, close to a floor 24, they are spaced apart by means of a profile 7. As it is evident from the illustration in FIG. 2, the glass panes 4 and 5 extend with their glass pane edges 10 over the entire height and thus over the entire width of the door leaf 2, and they are simultaneously secured by means of profile projections 11 provided at the profile 6, and by means of profile projections 28 provided at the profile 7. Therefore, in this embodiment example, the glass pane edges 10 are provided with a small chamfer, which is covered at the same time by profile lips. These provide an optimum protection, especially in the region of the edges, for the glass panes 4 and 5, which are preferably manufactured from safety glass (single layer safety glass, ESG). The profile 6 is executed as solid profile and is, likewise the profile 7, preferably manufactured from light metal, plastic or wood or from any other appropriate material. In this case, the profile 6 presents in its exterior closing region an exterior edge 14 with a rounded (ball-shaped) form. On the air gap 30 side, between the glass panes 4 and 5, the profile 6 is executed with a deepening 12 arranged between projections 13 on either side, which provide a locating for the glass panes 4 and 5 and thus for the connection of the glass panes 4 and 5 with the profile 6.

Oriented towards the space between the glass panes 4 and 5, the profile 7 has got the same cross section as the profile 6. However, in the exterior region of the door leaf 2 in further continuation of the profile projection 28, legs 15 are conformed pointing towards the floor 24. In their center, the legs 15 include a deepening 16. The deepening 16 is provided to mount for example door rails to connected a door closer or to connect other fittings. The legs 15 are provided to adapt the prefabricated fire rated door on site to the required dimension. By correspondingly cutting the legs 15, the optimum length will be achieved for such fire rated door type without dismounting the door leaf on site.

An enamelling 3 is provided on the glass panes 4 and 5, in the connection region between the profiles 7 and 6, whereby said profiles 6 also run vertically. By doing so, it is guaranteed that the profiles 6 and 7, installed within the air gap 30, are not visible to the exterior side. As only the exterior edge zone is concerned, despite the enamelling 3, the entire door leaf's 2 appearance is not damaged in a completely de-materialised wall manufactured only from glass, as frame parts and moreover fittings are invisible. Simultaneously it is guaranteed that the glass panes 4 and 5 are not executed with boreholes, to ensure an increased fire protection.

The air gap 30 is partially filled by a fire rated glass pane 9. The fire rated glass pane 9 is supported by means of spacers 8, leaning on the glass panes 4 and 5. The ends of the fire rated glass pane 9 engage in this case into the deepenings 12, such that if the fire rated glass pane respectively the profiles 6 and 7 expand, a destruction of the fire rated glass pane 9 will not occur.

The upper part of FIG. 2 illustrates a door frame 31, which is mounted on an existing jamb identified by numeral 18 and which is installed within mortar 23 over masonry 17. In this case, the door frame 31 is realised from two almost L-shaped additional profiles 19. On the one hand, at the mortar 23, a sealing 21 seals the profile 19, whereby in the center region of the door leaf 2, a gap remains between the additional profiles 19. This gap is closed by means of a fire protection laminate in form of a sealing profile 22. The additional profile 19 is simultaneously sealed and fastened in this zone with regard to the existing jamb 18 by means of a sealing 20. In the event of a fire, an automatic sealing of the door frame 31 with regard to the door leaf 2 would be achieved thanks to the intumescence of the fire protection laminate 22.

Figure 3:
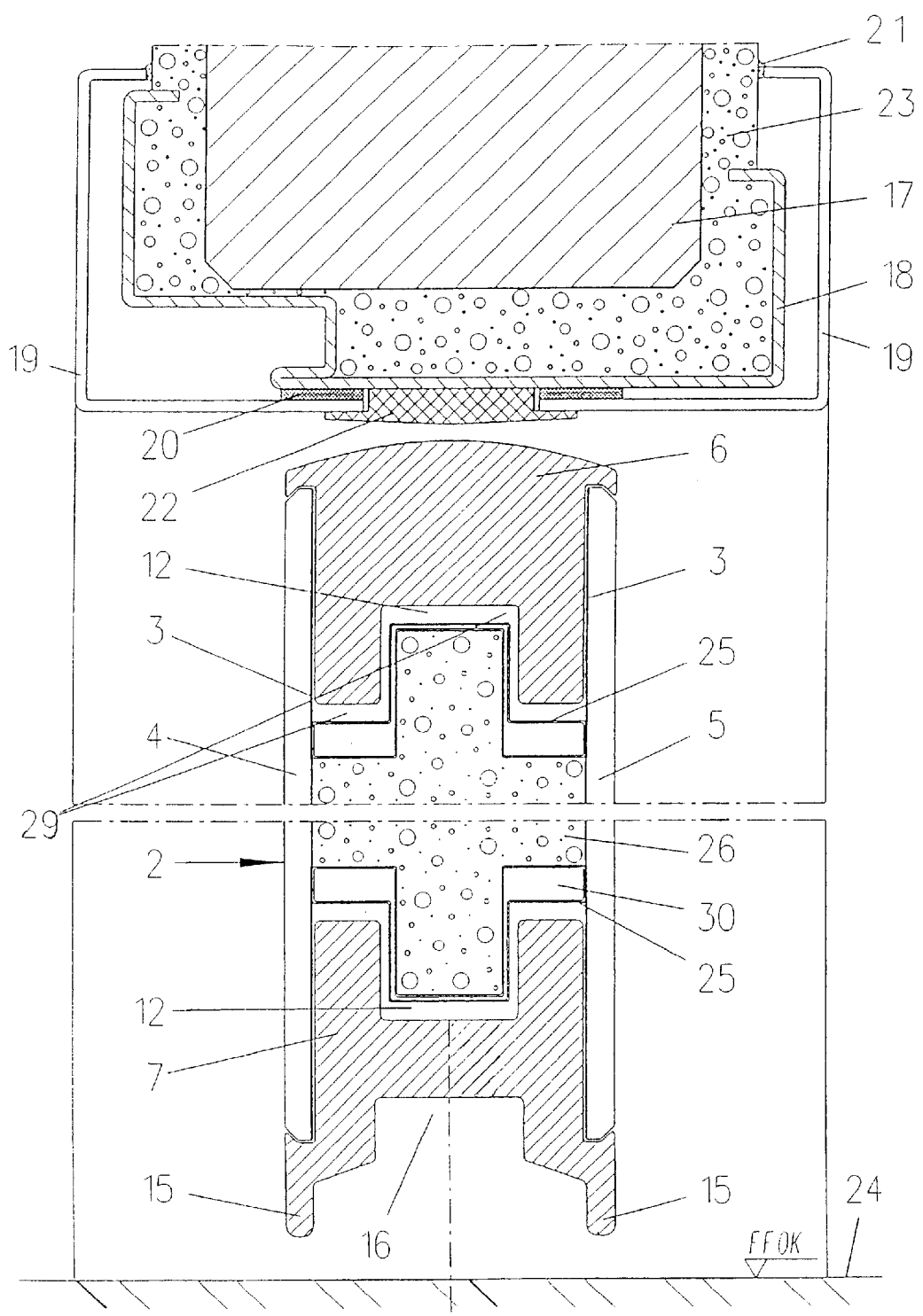
FIG. 3: a fire rated door in a vertical section according to FIG. 1.

In another embodiment example, in FIG. 3, the fire protection effect of the door leaf 2 is realised in another way. Instead of proceeding like in FIG. 2 and using a fire rated glass pane 9, in this case a fire protection material 26 is employed, which is preferably transparent and liquid. To introduce the fire protection material 26 into the door leaf, spacer sections 25 are incorporated with a certain distance 29 into the air gap 30, whereby they immerse simultaneously into the deepenings 12. As shown in FIG. 3, the spacer section 25 is executed as double-wall spacer section in order to compensate corresponding expansion coefficients of the fire rated material 26. The structure of this door, and likewise of the one displayed in FIG. 2, clearly reveals that the observer does not recognise this door-type, constructed according to the principle of dematerialised door leafs, from the outside as a fire rated door and that nevertheless, in the event of a fire this door type guarantees sufficient and corresponding protection within a fire protection partition.

Due to the fact, that the deepening 12 situated within the frame is provided in the profiles 6 and 7, an increased safety potential is given, as in the event of a fire, for example the fire protection material represented in FIG. 3 will stiffen and will persist as plane material, thanks to the profiles 6, 7 blocked on the exterior side in the door frame 31, even if one or the two glass panes 4, 5 should burst. This is likewise applicable to the fire protection glass pane 9 of FIG. 2.

Figure 4:
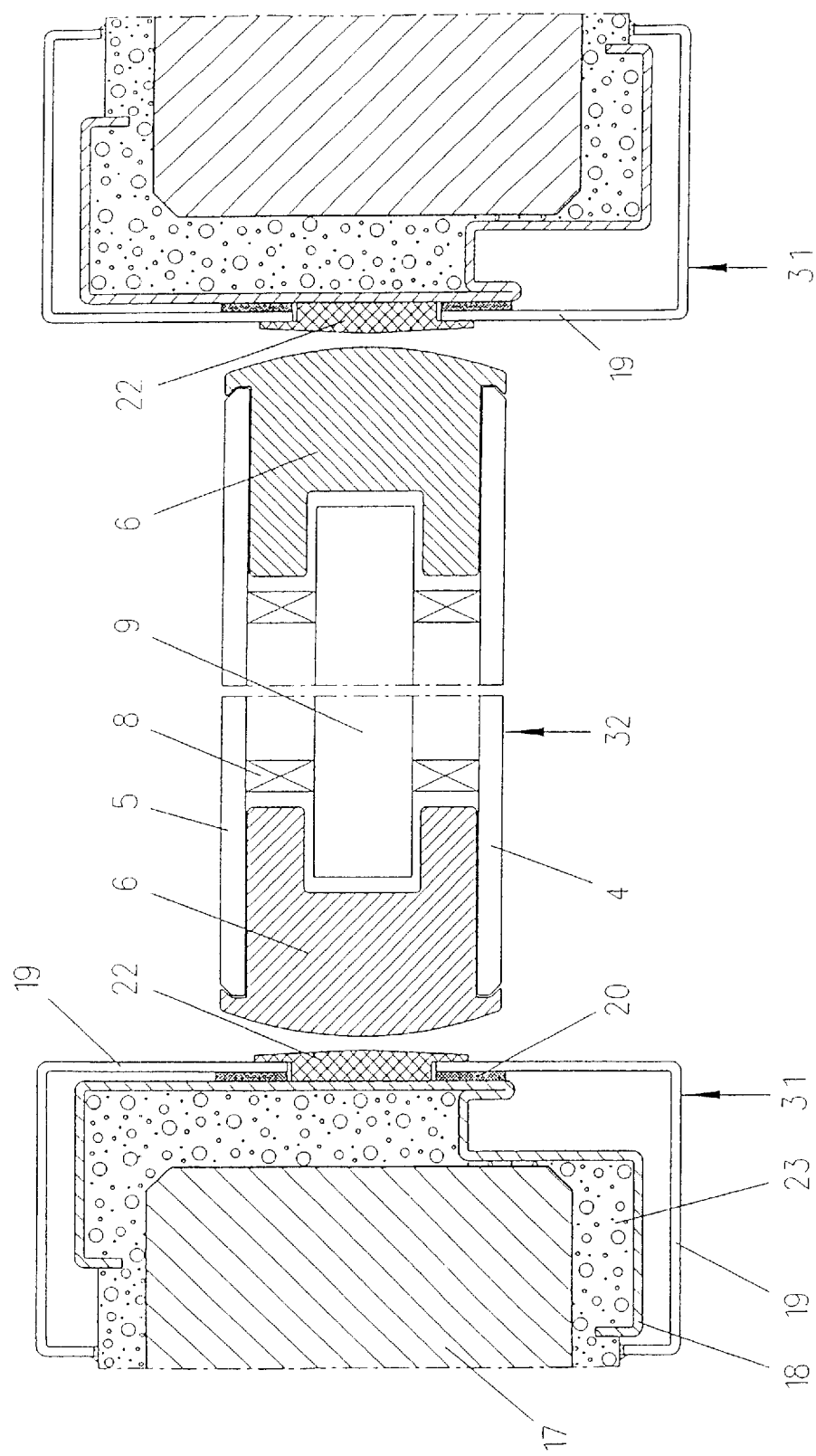
FIG. 4: a fire rated door according to FIG. 1 represented as horizontal section with capped jamb.

A center-pivoted door, which can be realised without any problem for example from profiles 6 in conjunction with a fire rated glass plane 9, is illustrated in FIG. 4. In a horizontal section, the center-pivoted door 32 is arranged inside the additional profiles 19 of the door frame 31. Here again, it is evident that in the event of an outbreak of fire and an increase in temperature the sealing profile 22 seals the center-pivoted door 32 with regard to the door frame 31.

In an application where the center pivoted door 32 is installed inside an appropriate fire resistant jamb 18, sealing profiles 1, in form of fire protection laminates, are incorporated into the exterior edges 14 of the profiles 6 oriented towards the jamb 18.

Figure 6:
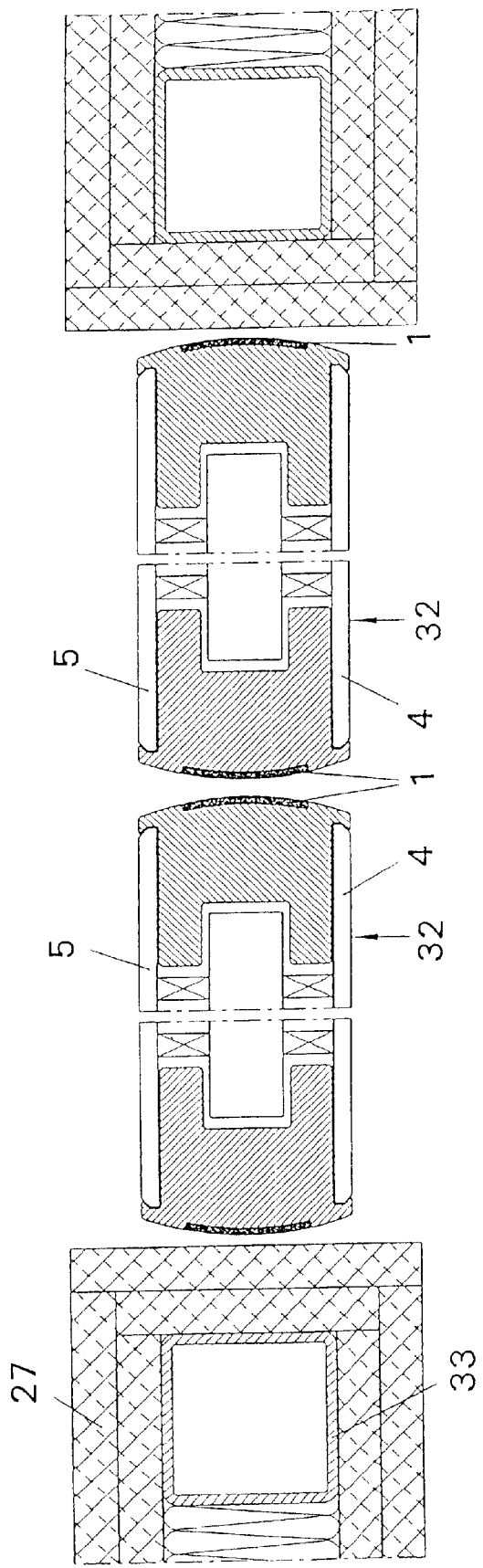
FIG. 6: a horizontal section through a double leaf center pivoted door system where the door frame is executed with fire rated plates.
Figure 7:
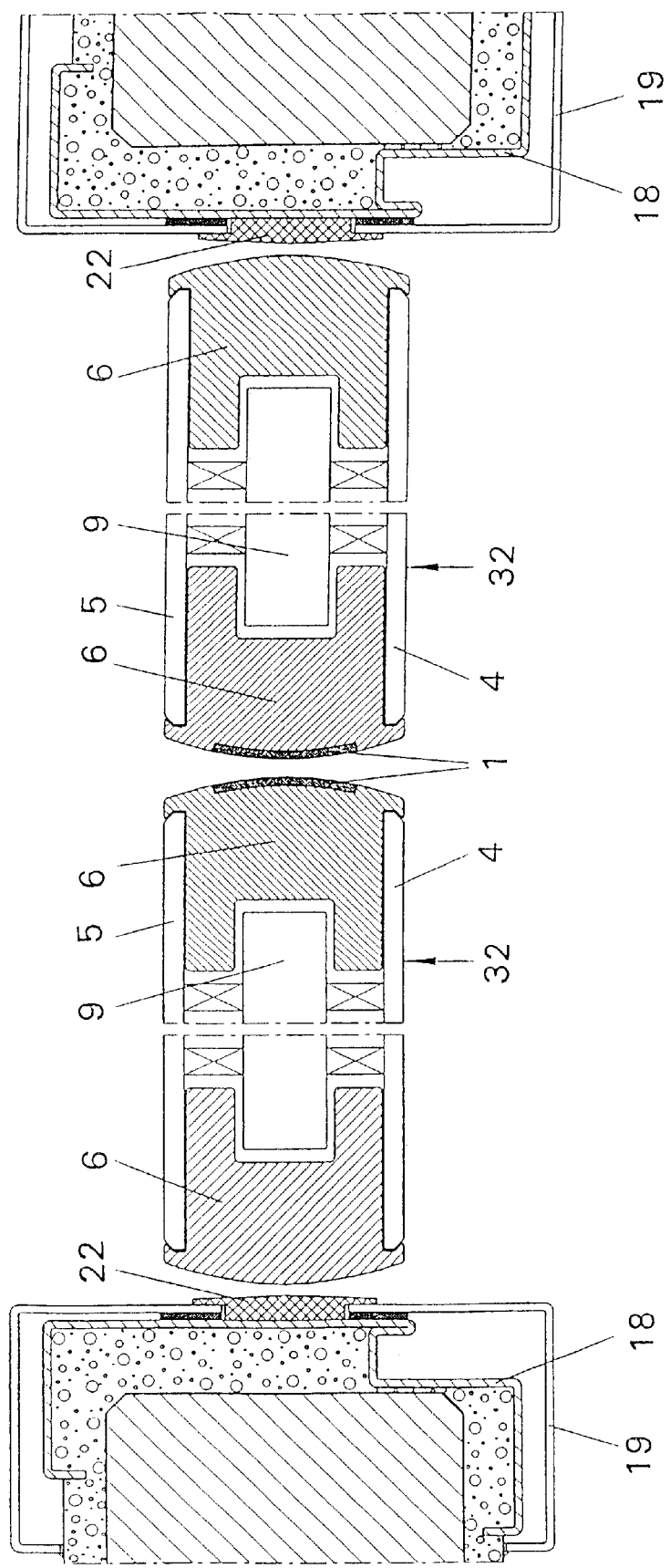
FIG. 7: a horizontal section through a double leaf center pivoted door with capped frame.

FIG. 6 represents a double leaf center-pivoted door 32 including two leaves, located between a door frame made from gypsum plasterboards 27 mounted on a sub-structure 33 in this case again, the center-pivoted doors 32 are executed with sealing profiles 1 in the zone of the door frame as well as in the central region. FIG. 7 illustrates an example analogous to FIG. 6, whereby in this case fire protection laminates are only included in the central region in the profiles 6 and in the region of the capped jamb 18 between the additional profiles 19, the sealing profile 22 provides properly sealing in the event of a fire.

The description clearly reveals that said designed fire rated door is absolutely conform to its final purpose and simultaneously provides a free view which is usually not the case with a fire rated door made from steel or sheet metal.

Figure 8:
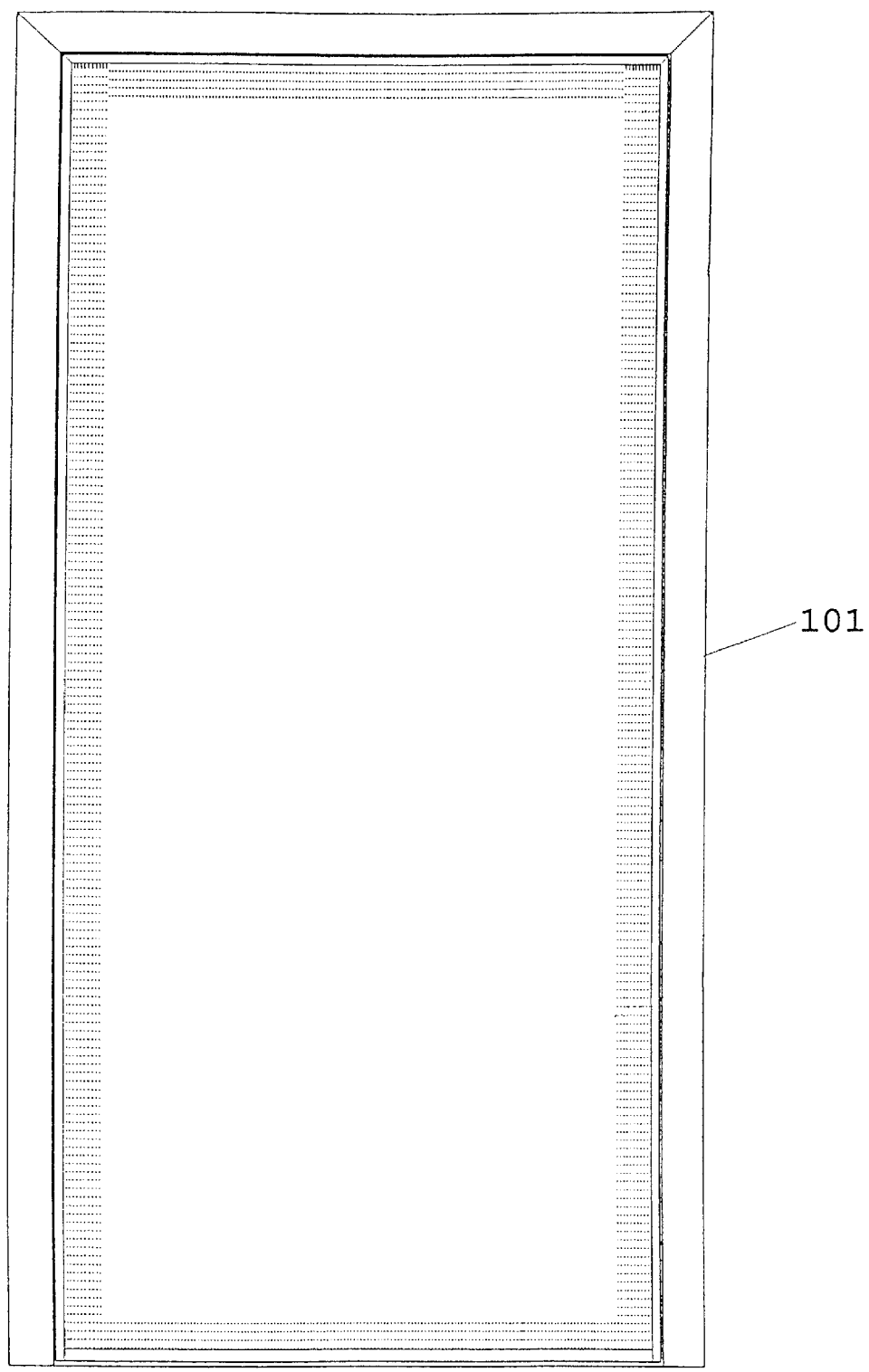
FIG. 8: a sliding fire rated door according to at least one embodiment of the present invention.

FIG. 8 shows a sliding fire rated door 101 according to at least one embodiment of the present invention.

One feature of the invention resides broadly in a fire rated door with a surrounding door frame, consisting of a glass pane, which is embedded within its circumferential metal frame, characterized in that the fire rated door consists of at least one door leaf (2, 32) built from two glass panes (4, 5) spaced apart by means of profiles (6, 7), said mass panes (4, 5) almost extend as far as to the border of the door leaf (2, 32).

Another feature of the invention resides broadly in a fire rated door characterized in that a transparent fire protection material (9, 26) is comprised between the spaced glass panes (4, 5).

Yet another feature of the invention resides broadly in a fire rated door characterized in that the profile (6) presents a rounded exterior edge (14) continuing on either side respectively in a profile projection (11), which are respectively executed such that just the glass pane edges (10) (thickness of the glass panes 4, 5) of the glass panes (4, 5) are covered.

Still another feature of the invention resides broadly in a fire rated door characterized in that the profile (7) is arranged in the horizontal lower part of the door leaf (2, 32), and respectively presents two recesses (28) having almost the dimension measure of the thickness of the glass panes (47 5), into which recesses the glass panes (4, 5) are embedded, and deflecting legs (15) with intermediate groove (deepening) (16) are realized underside.

A further feature of the invention resides broadly in a fire rated door characterized in that the profiles (6, 7) present a groove (deepening) (12) oriented towards an air gap (30) between the glass panes (4, 5).

Another feature of the invention resides broadly in a fire rated door characterized in that the fire protection material is a fire rated glass pane (9) and inserted into the grooves (deepenings) (12), said fire rated glass pane (9) is supported by spacers (8) with regard to the lateral glass panes (4, 5).

Yet another feature of the invention resides broadly in a fire rated door characterized in that a circumferential spacer section (25) engages into the groove (deepening) (12), leaning at the same time on the glass panes (4, 5) and a space created by means of the spacer section (25) is filled in with a fire protection material (26).

Still another feature of the invention resides broadly in a fire rated door characterized in that the fire protection material (26) is a fire rated gel.

A further feature of the invention resides broadly in a fire rated door characterized in that the spacer section (25) is installed at a distance (29) with regard to the profiles (6, 7).

Another feature of the invention resides broadly in a fire rated door characterized in that the spacer section (25) is executed as double wall with intermediate air gap.

Yet another feature of the invention resides broadly in a fire rated door characterized in that a circumferential frame is realized between the glass panes (4, 5) by means of the profiles (6, 7), which frame is covered through an enameling (3) on the glass panes in the region of the profiles (6, 7).

Still another feature of the invention resides broadly in a fire rated door characterized in that the profiles (6, 7) are made from plastic, metal, steel or wood.

A further feature of the invention resides broadly in a fire rated door characterized in that fittings are incorporated within the profiles (6, 7).

Another feature of the invention resides broadly in a fire rated door characterized in that a fire protection laminate (1, 22) is installed into the exterior edge (14) of the profiles (6, 7), which laminate will intumesce when heat develops.

Yet another feature of the invention resides broadly in a fire rated door characterized in that the door frame consists of a divided additional profile (19) with intermediate fire protection laminate (22).

Still another feature of the invention resides broadly in a fire rated door characterized in that the door frame is mounted over an existing jamb (18).

A further feature of the invention resides broadly in a fire rated door characterized in that the door frame is built by gypsum plasterboard (27).

Another feature of the invention resides broadly in a fire rated door characterized in that the door leaf (2) is a single leaf or a double leaf swing door.

Yet another feature of the invention resides broadly in a fire rated door characterized in that the door leaf (2) is a single leaf or a double leaf center pivoted door (32).

Still another feature of the invention resides broadly in a fire rated door characterized in that the glass panes (4, 5) consist of safety glass.

A further feature of the invention reside broadly in a fire rated door characterized in that the fire rated door s fire protection efficacy is achieved by means of the fire protection laminate (1, 22) introduced into the profiles (6, 7) respectively between the additional profiles (19).

Another feature of the invention resides broadly in a fire rated door characterized in that the plastic is a glass fiber reinforced plastic.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the patents, patent applications or patent publications, which were cited in the PCT Search Report dated Oct. 29, 2000, and/or cited elsewhere are hereby incorporated by reference as if set forth in their entirety herein as follows: U.S. Pat. No. 5,380,569 A, having inventors Weidemann, Guenter et al., dated Jan. 10, 1995; European Patent No. 0 721 047 A, having inventor Niemann, Hans Dieter, dated Jul. 10, 1996; European Patent No. 0 590 978 A, to Mitsui Toatsu Chemicals, Central Glass Co. Ltd. dated Apr. 6, 1994; Federal Republic of Germany Patent No. 197 33 381 A, to Geze GmbH & Co., dated Mar. 26, 1998; European Patent No. 0 853 179 A, with to Geze GmbH & Co, dated Jul. 15, 1998; Federal Republic of Germany Patent No. 297 23 777 U, with inventors Woschko, Donat; Woschko, Manfred, dated Apr. 1, 1999; French Patent No. 297 23 777 U, with inventor Jean Biscutti, dated May 29, 1981; U.S. Pat. No. 5,916,077 A, with inventor Tang Jung-Chaun, dated Jun. 29, 1999; "Advertisement" Bouwwereld, NL, Misset. Doetinchem, Bd. 89, Nr. 12, dated Jun. 11, 1993; U.S. Pat. No. 5,437,902 A, dated Aug. 1, 1995; U.S. Pat. No. 5,654,839 A, dated Aug. 5, 1997; Canadian Patent No. 2260070 A, dated Jan. 22, 1998.

The details in the patents, patent applications and publications may be considered to be incorporable, at applicant's option, into the claims during prosecution as further limitations in the claims to patentably distinguish any amended claims from any applied prior art.

The above-described figures are again referred to:

FIG. 1 shows a view of a single leaf fire rated door, as seen from the front.

FIG. 2 shows a vertical section through a fire rated door according to FIG. 1, as seen in a profile from the side, with the floor (24) in the bottom of the drawing, and the door frame (31) at the top of the drawing. The door is shown with a fire rated glass pane (9) between two glass panes (4, 5). Further the door is shown with a groove (deepening) (16) surrounded by two legs (15) toward the floor (24).

FIG. 3 shows a fire-rated door in a vertical section according to FIG. 1, as seen in a profile from the side, with the floor (24) in the bottom of the drawing, and the door frame (31) at the top of the drawing. The door is shown with a fire protection material (26) between two glass panes (4, 5). Further the door is shown with a groove (deepening) (16) surrounded by two legs (15) toward the floor (24). The door frame (31) preferably consists of additional profiles (19) covering the original jamb (18) on each side.

FIG. 4 shows a fire rated door according to FIG. 1 represented as a horizontal section with a capped jamb, as given in an overhead view, with the door frame (31) on each side of the center pivoted door (32). The door is shown with a fire rated glass pane (9) between two glass panes (4, 5).

Figure 5:
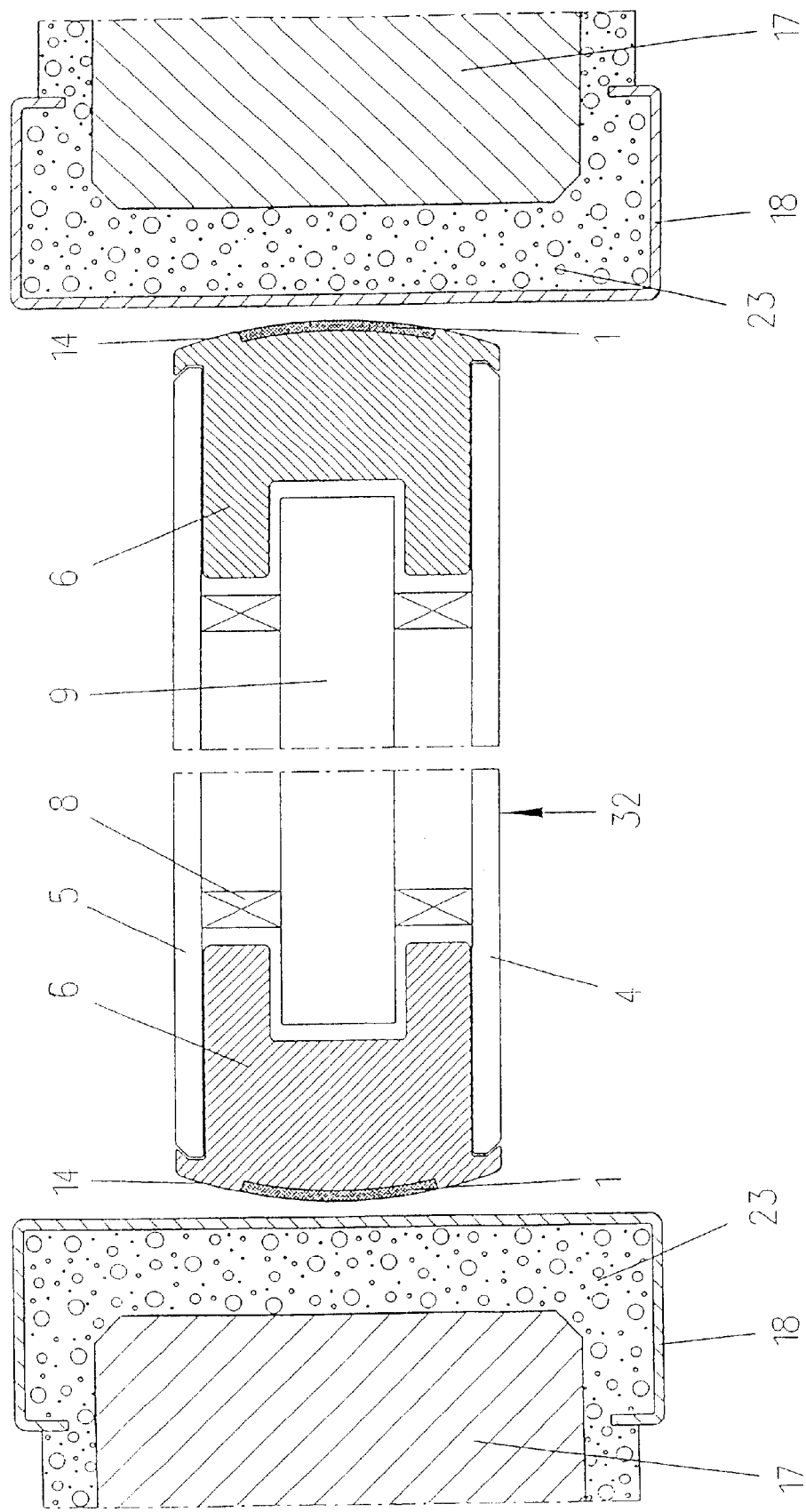
FIG. 5: like FIG. 1, as horizontal section with an existing door frame.

FIG. 5 shows like FIG. 1, as horizontal section with an existing door frame, as given in an overhead view, with the jambs (18) on each side of the center pivoted door (32). The door is shown with a fire rated glass pane (9) between two glass panes (4, 5).

FIG. 6 shows a horizontal section through a double leaf center pivoted door system where the door frame is executed with fire rated plates, as given in an overhead view, with the gypsum plasterboard door frame (27) on each side of the double leaf center-pivoted door (32).

FIG. 7 shows a horizontal section through a double leaf center-pivoted door with a capped frame, as given in an overhead view, with the capped jamb (18) on each side of the double leaf center-pivoted door (32).

FIG. 1 broadly illustrates a front view of a single leaf fire-rated door (2) with a door frame (31) surrounding the door leaf (2). Reference numeral (3) identifies an enameling on the glass panes (4 and 5) (see FIGS. 2, 3, 4, 5, 6 and 7) stretching alongside all the four edges of the door leaf (2). The technical structures of the door and variations hereof are broadly being described in FIGS. 2, 3, 4, 5, 6 and 7.

FIG. 2 broadly illustrates a vertical section of a single leaf fire-rated door as seen in a profile from the side, with the floor (24) in the bottom of the drawing and the door frame (31) in the top of the drawing. The door leaf (2) is broadly composed by two glass panes (4 and 5) spaced apart in the upper part by means of a profile (6) and in the lower part (close to the floor (24)) by means of a profile (7). The glass panes (4 and 5) which are provided with a small chamfer at the glass pane edge (10) extend possibly quasi over the entire height and over the entire width of the door leaf (2). The profiles (6 and 7) are broadly made with small profile projections (11 and 28) which possibly cover the extreme edge (10) of the glass panes (4 and 5) by profile lips. Simultaneously, the glass panes (4 and 5) are maybe secured by the profiles (6 and 7). The lips possibly provide protection in the region of the edges of the glass panes (4 and 5) which are preferably manufactured from safety glass (single layer safety glass, ESG).

The profiles (6 and 7) are both preferably executed with projections (13) which provide grooves (deepenings) (12) at the top and at the bottom of the door leaf. These grooves (deepenings) (12) provide for an air gap (30) (see FIG. 3) which is partially filled by a fire rated glass pane (9) in such a way that the ends of the fire rated glass pane (9) engage into the grooves (deepenings) (12). The fire rated glass pane (9) is supported by means of spacers (8) resting on the glass panes (4 and 5). Consequently a destruction of the fire rated glass pane (9) will preferably not occur, in case the fire rated glass pane (9) and/or the profiles (6 and 7) should expand.

An enameling (3) is preferably provided on the inside of the glass panes (4 and 5) in the area where these connect to the profiles (6 and 7). By doing so, it is likely guaranteed that the profiles (6 and 7), installed with the air gap, are not visible to the exterior side of the door leaf (see FIG. 1). Simultaneously, it is guaranteed that the glass panes (4 and 5) are not executed with boreholes, which broadly ensures an increased fire protection.

The profiles (6 and 7) are preferably executed as solid profiles, maybe manufactured from light metal, plastic or wood or any other appropriate material. The profile (6) presents in its exterior closing region an exterior edge (14) with a possibly curved form.

The upper part of FIG. 2 broadly illustrates a door frame (31) which is mounted on an existing jamb (18), and which is covering mortar (23) over masonry (17). In this case, the door frame (31) is broadly realized from two almost L-shaped additional profiles (19) covering the existing jamb (18). A sealing (21) is added preferably to seal the end where the additional profiles (19) connects to the mortar (23) on each side of the door frame (31). A gap remains between the two additional profiles (19), which is closed by means of a fire protection laminate in the form of a sealing profile (22). The additional profiles (19) are further sealed and fastened to the existing jamb (18) by means of a sealing (20) in the sealing profile (22) area. In the event of a fire, an automatic sealing of the space between the door frame (31) and the door leaf (2) (see FIG. 1) will possibly be achieved due to the intumescence of the fire protection laminate (22).

Profile (7) broadly distinguishes itself in the way that in a continuation of the profile projection (28) two legs (15) are conformed pointing towards the floor (24). A groove (deepening) (16) is created between the two legs (15). This groove (deepening) (16) is possibly provided to mount e.g. door rails in the event the door is executed as a sliding door or to maybe connect other fittings. The legs (15) are provided to adapt the prefabricated fire rated door leaf (2) on site, to the required dimension. The optimum height of the fire rated door can possibly be adjusted by cutting the legs (15) on site without dismantling the door leaf.

FIG. 3 is another embodiment sample as the fire protection effect of the door leaf (2) (see FIG. 1) is realized in a slightly different way. In FIG. 2 a fire rated glass pane (9) is used between the two glass panes (4 and 5). However, in FIG. 3 a fire protection material (26), preferably transparent and liquid is employed between the two glass panes (4 and 5). To introduce the fire protection material (26) into the door leaf, spacer sections (25) are preferably incorporated with a certain distance (29) to the profiles (6 and 7) and into the grooves (deepenings) (12) to broadly create an air gap (30). The spacer section (25) is executed as a double-wall spacer section to broadly compensate in the event of the fire rated material's (26) possible expansion.

FIG. 4 given in an overhead view, broadly shows a fire rated door of possibly the same type as in FIG. 2. However, FIG. 4 shows the fire rated door as center-pivoted (32), realized from profiles (6) in conjunction with a fire rated glass pane (9). Like in FIG. 2 the door frame (31) of FIG. 4 consists of additional profiles (19) mounted on top of an existing jamb (18). Here, like in FIG. 2, the sealing profile (22) will possibly seal the center-pivoted door (32) with the door frame (31) in the event of fire.

FIG. 5 given in an overhead view, broadly shows the center pivoted door (32) of FIG. 4. However, in FIG. 5 the center pivoted door (32) is installed inside an appropriate fire resistant jamb (18), which possibly does not have sealing profiles. Therefore, sealing profiles (1) in the form of fire protection laminates are broadly incorporated into the exterior edges (14) of the profiles (6) which are oriented towards the jamb (18).

FIG. 6 given in an overhead view, broadly represents two center-pivoted door leaves (32) located side by side in a door frame. Like the door of FIG. 5 the two center-pivoted door leaves (32) of FIG. 6 are executed with sealing profiles (1) in the form of fire protection laminates in the zone that connects to the door frame (when the doors are closed) as well as in the zone that connects the two door leaves (when the doors are closed). The door frame is made from gypsum plasterboard (27) mounted on a sub-structure (33).

FIG. 7 as given in an overhead view illustrates an example analogous to FIG. 6, however in this case the two center-pivoted door leaves (32) located side by side are installed in a capped jamb door frame similar to the one shown in FIGS. 2, 3 and 4. Sealing of the doors is provided in the zone of the door frame by the installation of sealing profiles (22) between the additional profiles (19), and in the zone between the two doors by including a sealing profile (1) in the central region of the profiles (6).

Some examples of fire rated gels which may possibly be incorporated in an embodiment of the present invention may be found in: U.S. Pat. No. 5,885,713 issued to von Bonin, et al. on Mar. 23, 1999 and entitled "Fire-resistant glass containing a gel with improved melting resistance, and process for the preparation thereof"; U.S. Pat. No. 5,653,839 issued to Itoh, et al. on Aug. 5, 1997 and entitled "Fire-resistant glass and process for production thereof"; U.S. Pat. No. 5,624,998 issued to Itoh, et al. on Apr. 29, 1997 and entitled "Hardenable composition, aqueous gel and applications"; U.S. Pat. No. 5,519,088 issued to Itoh, et al. on May 21, 1996 and entitled "Hardenable composition, aqueous gel and applications thereof"; U.S. Pat. No. 5,496,640 issued to Bolton, et al. on Mar. 5, 1996 and entitled "Fire resistant transparent laminates"; U.S. Pat. No. 5,217,764 issued to Eich on Jun. 8, 1993 and entitled "Fire protection glazing", all of these U.S. patents being hereby expressly incorporated by reference herein.

Some examples of transparent fire protection which may possibly be incorporated in an embodiment of the present invention may be found in: U.S. Pat. No. 5,462,805 issued to Sakamoto, et al. on Oct. 31, 1995 and entitled "Fire-protection and safety glass panel"; U.S. Pat. No. 5,425,901 issued to von Bonin, et al. on Jun. 20, 1995 and entitled "Fireproofing gels, processes for their preparation and their use, in particular for fireproof glazing"; U.S. Pat. No. 5,230,954 issued to Sakamoto, et al. on Jul. 27, 1993 and entitled "Fire-protection and safety composite glass panel"; U.S. Pat. No. 5,217,764 issued to Eich on Jun. 8, 1993 and entitled "Fire protection glazing"; U.S. Pat. No. 6,159,606 issued to Gelderie, et al. on Dec. 12, 2000 and entitled "Fire-resistant glazing panel"; U.S. Pat. No. 5,543,230 issued to von Bonin, et al. on Aug. 6, 1996 and entitled "Laminated glass construction having an intermediate layer of a fire-proofing gel"; U.S. Pat. No. 4,873,146 issued to Toussaint, et al. Oct. 10, 1989 and entitled "Transparent fire-screening panels", all of these U.S. patents being hereby expressly incorporated by reference herein.

An example of fire rated glass which may possibly be incorporated in an embodiment of the present invention may be found in: U.S. Pat. No. 5,910,620 issued to O'Keeffe, et al. on Jun. 8, 1999 and entitled "Fire-rated glass and method for making same", this U.S. patent being hereby expressly incorporated by reference herein.

Some examples of fire protection glass panes which may possibly be incorporated in an embodiment of the present invention may be found in: U.S. Pat. No. 5,380,569 issued to Kujas, et al. on Jan. 10, 1995 and entitled "Fire resistant glass partition"; U.S. Pat. No. 5,776,844 issued to Koch, et al. Jul. 7, 1998 and entitled "Compositions of silico-sodo-calcic glasses and their applications"; U.S. Pat. No. 5,958,812 issued to Koch, et al. Sep. 28, 1999 and entitled "Compositions of silico-sodo-calcic glasses and their applications"; U.S. Pat. No. 5,628,155 issued to Nolte, et al. May 13, 1997 and entitled "Fire-resistant structural component with glass pane", all of these U.S. patents being hereby expressly incorporated by reference herein.

Some examples of enameling which may possibly be incorporated in an embodiment of the present invention may be found in: U.S. Pat. No. 6,043,171 issued to Siebers, et al. on Mar. 28, 2000 and entitled "Lead-free and cadmium-free glass compositions for glazing, enameling and decorating glass of glass-ceramics"; U.S. Pat. No. 5,782,999 issued to Kostrubanic on Jul. 21, 1998 and entitled "Steel for enameling and method of making it"; U.S. Pat. No. 5,633,090 issued to Rodek, et al. on May 27, 1997 and entitled "Lead-and cadmium-free glass composition for glazing, enameling and decorating glass", all of these U.S. patents being hereby expressly incorporated by reference herein.

Some examples of fire rated doors which may possibly be incorporated in an embodiment of the present invention may be found in: U.S. Pat. No. 4,748,771 issued to Lehnert, et al. on Jun. 7, 1988 and entitled "Fire door"; U.S. Pat. No. 4,165,591 issued to Fitzgibbon on Aug. 28, 1979 and entitled "Component type building construction system"; U.S. Pat. No. 5,943,824 issued to Tatara on Aug. 31, 1999 and entitled "Fire rated, hinged, swinging door"; U.S. Pat. No. 6,183,023 issued to Yulkowski on Feb. 6, 2001 and entitled "Door with integrated fire exit device"; U.S. Pat. No. 5,896,907 issued to Dever, et al. on Apr. 27, 1999 and entitled "Rolling fire door including a door hold-open/release system"; U.S. Pat. No. 5,886,637 issued to Stuckey on Mar. 23, 1999 and entitled "Door with built-in smoke and fire detector"; U.S. Pat. No. 5,850,865 issued to Hsieh on Dec. 22, 1998 and entitled "Rolling fire door with delayed closing mechanism"; U.S. Pat. No. 5,565,274 issued to Perrone, Jr., et al. on Oct. 15, 1996 and entitled "Fire rated floor door and control system", all of these U.S. patents being hereby expressly incorporated by reference herein.

Some examples of glass fiber reinforced plastic which may possibly be incorporated in an embodiment of the present invention may be found in: U.S. Pat. No. 5,868,080 issued to Wyler, et al. on Feb. 9, 1999 and entitled "Reinforced plastic pallets and methods of fabrication"; U.S. Pat. No. 5,634,847 issued to Shea on Jun. 3, 1997 and entitled "Fire Retardant reinforced plastic duct system"; U.S. Pat. No. 5,448,869 issued to Unruh, et al. on Sep. 12, 1995 and entitled "Composite framing member and window or door assembly incorporating a composite framing member"; U.S. Pat. No. 5,446,250 issued to Oka on Aug. 29, 1995 and entitled "Fiberglass reinforced plastic damping material"; U.S. Pat. No. 4,619,954 issued to Warner, II on Oct. 28, 1986 and entitled "Fiberglass reinforced plastic sheet material with fire retardant filler"; U.S. Pat. No. 4,676,041 issued to Ford on Jun. 30, 1987 and entitled "Corrosion-resistant door and its method of manufacture", all of these U.S. patents being hereby expressly incorporated by reference herein.

The invention as described herein above in the context of the preferred embodiments is not to be taken as limited to all of the provided details thereof, since modifications and variations thereof may be made without departing from the spirit and scope of the invention.

Index of Reference Numerals

1. Sealing profile (fire protection laminate)
2. Door leaf
3. Enamelling
4. Glass pane
5. Glass pane
6. Profile
7. Profile
8. Spacer
9. Fire rated glass pane
10. Glass pane edge
11. Profile projection 12. Deepening (Groove)
13. Projection
14. Exterior edge
15. Leg
16. Deepening (Groove)
17. Masonry
18. Jamb
19. Additional profile
20. Sealing
21. Sealing
22. Sealing profile (fire protection laminate)
23. Mortar
24. Floor
25. Spacer sections
26. Fire protection material
27. Gypsum plasterboard
28. Profile projection
29. Distance (air)
30. Air gap
31. Door frame
32. Center pivoted door
33. Sub-structure

What is claimed is:

1. A fire rated glass door assembly configured to inhibit the spread of fire and smoke in the region of a wall of a building, said fire rated glass door assembly comprising:
   a first side and a second side being disposed opposite said first side;
   a fire protection partition of a building;
   a door jamb; said door jamb comprising a substantially contiguous and unitary frame structure;
   said door jamb being disposed in a stationary manner in said fire protection partition of a building;
   said door jamb comprising a first side and a second side disposed opposite said first side;
   said door jamb comprising a material to provide said door jamb with a fire rating and thus with the capability to withstand fire a predetermined time with a predetermined fire temperature on said first side of said door jamb and a predetermined maximum temperature on said second side of said door jamb;
   at least one door leaf;
   said at least one door leaf comprising a first side and a second side disposed opposite said first side;
   said first side of said at least one door leaf comprising a first glass pane;
   said second side of said at least one door leaf comprising a second glass pane;
   said glass panes of said at least one door leaf being configured to provide said at least one door leaf with a fire rating and thus with the capability to withstand fire a predetermined time with a predetermined fire temperature on said first side of said at least one door leaf and a predetermined maximum temperature on said second side of said at least one door leaf;
   said at least one door leaf comprising a substantially contiguous and unitary frame structure;
   said at least one door leaf being configured and disposed to be mobile in reference to said fire protection partition of a building;
   said at least one door leaf at least partially enclosed by said door jamb;
   said at least one door leaf comprising a compartment;
   said compartment being disposed between said first side and said second side of said at least one door leaf and to extend over a substantial portion of said at least one door leaf;
   a material being disposed in said compartment;
   said material in said compartment comprising a transparent foam to impart to said door assembly a fire rating and thus with the capability to withstand fire a predetermined time with a predetermined fire temperature on said first side of said door assembly and a predetermined maximum temperature on said second side of said door assembly to thus enhance the fire rating capability of said fire rated door assembly to withstand fire and smoke;
   at least one of:
      said door jamb and said at least one door leaf comprising a synthetic/plastic material;
      said synthetic/plastic material comprising a glass fiber reinforced plastic material;
      said glass fiber reinforced plastic material comprising:
         a support material comprising glass fiber rovings;
         said glass fiber rovings being arranged in axial/transverse direction;
         at least one of:
            said door jamb and said at least one door leaf comprising a frame;
            said frame comprising a profile structure;
            said profile structure comprising a synthetic/plastic material;
            said profile structure, when considered in a radial direction, being reinforced with a glass fiber complex;
            said glass fiber complex comprising a molded and heat-hardened glass fiber complex;
            said glass fiber complex comprising glass fibers impregnated with a resin matrix; and
            said resin matrix comprising at least one of:
               unsaturated polyester resin;
               a hardener to harden said resin; at least one accelerator to accelerate hardening of said resin;
               additives to augment said resin;
               at least one coloring agent to impart color to said resin; and
               at least one fire retarding filler to render said profile structure fire retardant.

2. A fire rated door assembly configured to inhibit the spread of fire and smoke in the region of a wall of a building, said door assembly comprising:
   a first side and a second side being disposed opposite said first side;
   a door jamb;
   said door jamb being disposed in a stationary manner in a wall of a building;
   said door jamb comprising a first side and a second side disposed opposite said first side;
   said door jamb comprising a material to provide said door jamb with a fire rating and thus with the capability to withstand fire a predetermined time with a predetermined fire temperature on said first side of said door jamb and a predetermined maximum temperature on said second side of said door jamb;
   at least one door leaf;
   said at least one door leaf comprising a first side and a second side disposed opposite said first side;
   said at least one door leaf comprising a material to provide said at least one door leaf with a fire rating and thus with the capability to withstand fire a predetermined time with a predetermined fire temperature on said first side of said at least one door leaf and a predetermined maximum temperature on said second side of said at least one door leaf;

said at least one door leaf being configured and disposed to be mobile in reference to a wall of a building;

said at least one door leaf being disposed to be at least partially enclosed by said door jamb;

said at least one door leaf comprising a compartment;

said compartment being disposed between said first side and said second side of said at least one door leaf and to extend over a substantial portion of said at least one door leaf;

a material disposed in said compartment;

said material in said compartment comprising a transparent foam to impart to said door assembly the capability to withstand fire a predetermined time with a predetermined fire temperature on said first side of said door assembly and a predetermined maximum temperature on said second side of said door assembly to thus enhance the fire rating capability of said fire rated door assembly to withstand fire and smoke;

at least one of: said door jamb and said at least one door leaf comprising a synthetic/plastic material;

said synthetic/plastic material comprising a glass fiber reinforced plastic material;

said glass fiber reinforced plastic material comprising:
  a support material comprising glass fiber rovings;
  said glass fiber rovings being arranged in axial/transverse direction;
  at least one of:
    said door jamb and said at least one door leaf comprising a frame
    said frame comprising a profile structure;
    said profile structure comprising a synthetic/plastic material;
    said profile structure, when considered in a radial direction, being reinforced with a glass fiber complex;
    said glass fiber complex comprising a molded and heat-hardened glass fiber complex;
    said glass fiber complex comprising glass fibers impregnated with a resin matrix; and
    said resin matrix comprising at least one of:
      unsaturated polyester resin;
      a hardener to harden said resin;
      at least one accelerator to accelerate hardening of said resin
      additives to augment said resin;
      at least one coloring agent to impart color to said resin; and
      at least one fire retarding filler to render said profile structure fire retardant.

3. The fire rated door assembly according to claim 2 wherein:
  said first side of said at least one door leaf comprises a first glass pane;
  said second side of said at least one door leaf comprises a second glass pane; and
  said glass panes comprise a material to provide said at least one door leaf with a fire rating and thus with the capability to withstand fire for a predetermined time with a predetermined fire temperature on said first side of said at least one door leaf and a predetermined maximum temperature on said second side of said at least one door leaf.

4. The fire rated door assembly according to claim 2 including at least one of (A), (B), (C), and (D), wherein (A), (B), (C), and (D) comprise:
  (A) at least one of:
    said door leaf and said door jamb comprises at least one profile member to form a frame;
  (B) said compartment and said mobile door leaf comprise a single unitary structure;
  (C) said door leaf comprises a first glass pane disposed on said first side of said door leaf and a second glass pane disposed on said second side of said door leaf; and
    said first and second glass panes extend to a point adjacent the exterior edge of said mobile door leaf; and
  (D) said profile structure of at least one of:
    said door leaf and said door jamb comprises at least one hollow profile member;
    said fire rated door assembly comprises a material disposed in said at least one hollow profile member, said material in said at least one hollow profile member comprising a material to provide said door assembly with a fire rating and thus with the capability to withstand fire for a predetermined time with a predetermined fire temperature on said first side of said door assembly and a predetermined maximum temperature on said second side of said door assembly; and
    said material is disposed in said at least one hollow profile member to at least partially fill said at least one hollow profile member.

5. The fire rated door assembly according to claim 2 including all of (A), (B), (C), and (D), wherein (A), (B), (C), and (D) comprise:
  (A) at least one of:
    said door leaf and said door jamb comprises at least one profile member to form a frame;
  (B) said compartment and said mobile door leaf comprise a single unitary structure;
  (C) said door leaf comprises a first glass pane disposed on said first side of said door leaf and a second glass pane disposed on said second side of said door leaf; and
    said first and second glass panes extend to a point adjacent the exterior edge of said mobile door leaf; and
  (D) said profile structure of at least one of:
    said door leaf and said door jamb comprises at least one hollow profile member;
    said fire rated door assembly comprises a material disposed in said at least one hollow profile member, said material in said at least one hollow profile member comprising a material to provide said door assembly with a fire rating and thus with the capability to withstand fire for a predetermined time with a predetermined fire temperature on said first side of said door assembly and a predetermined maximum temperature on said second side of said door assembly; and
    said material is disposed in said at least one hollow profile member to at least partially fill said at least one hollow profile member.

6. A fire rated door arrangement configured to inhibit the spread of fire and smoke in the region of a wall of a building, said door arrangement comprising:
  a door jamb;
  said door jamb being configured to be disposed in a stationary manner in a wall of a building;

said door jamb comprising a first side and a second side disposed opposite said first side;

said door jamb comprising a material to provide said door jamb with a fire rating and thus with the capability to withstand fire a predetermined time with a predetermined fire temperature on said first side of said door jamb and a predetermined maximum temperature on said second side of said door jamb;

at least one door leaf;

said at least one door leaf comprising a first side and a second side disposed opposite said first side;

said at least one door leaf comprising a material to provide said at least one door leaf with a fire rating and thus with the capability to withstand fire a predetermined time with a predetermined fire temperature on said first side of said at least one door leaf and a predetermined maximum temperature on said second side of said at least one door leaf;

said at least one door leaf being configured to be mobile in reference to a wall of a building;

said at least one door leaf being configured to be disposed to be at least partially enclosed by said door jamb;

said first side and said second side of said at least one door leaf being configured and disposed to form a compartment therebetween;

said compartment extending over a substantial portion of said at least one door leaf; and a material being disposed in said compartment;

said material in said compartment comprising a material to impart to said door arrangement the capability to withstand fire a predetermined time with a predetermined fire temperature on a first side of said door arrangement and a predetermined maximum temperature on a second side of said door arrangement to thus enhance the fire rating capability of said fire rated door arrangement to withstand fire and smoke;

at least one of:
  said door jamb and said at least one door leaf comprising a synthetic/plastic material;
  said synthetic/plastic material comprising a glass fiber reinforced plastic material;
  said glass fiber reinforced plastic material comprising:
    a support material comprising glass fiber rovings;
    said glass fiber rovings being arranged in an axial/transverse direction;
  at least one of: said door jamb and said at least one door leaf comprises comprising a frame;
  said frame comprising a profile structure;
  said profile structure comprising a synthetic/plastic material;
  said profile structure, when considered in a radial direction, being reinforced with a glass fiber complex;
  said glass fiber complex comprising a molded and heat-hardened glass fiber complex;
  said glass fiber complex comprising glass fibers impregnated with a resin matrix; and
  said resin matrix comprising at least one of:
    unsaturated polyester resin;
    a hardener to harden said resin;
    at least one accelerator to accelerate hardening of said resin;
    additives to augment said resin;
    at least one coloring agent to impart color to said resin; and
    at least one fire retarding filler to render said profile structure fire retardant.

7. The fire rated door arrangement according to claim 6 wherein at least one of: said mobile door leaf and said compartment comprises a material to impart to said fire rated door arrangement a fire rating and thus the capability to withstand fire a predetermined time with a predetermined fire temperature on the fire exposed side of said door arrangement and a predetermined maximum temperature on the non-fire exposed side of said door arrangement.

8. The fire rated door arrangement according to claim 7 which comprises at least one of:
  a single leaf door, a double leaf door, and a sliding door.

9. The fire rated door arrangement according to claim 6 wherein said synthetic/plastic material comprises an unsaturated polyester resin with a fire retarding filler.

10. A fire rated window arrangement configured to inhibit the spread of fire and smoke in the region of a wall of a said fire rated window arrangement having a first side and a second side disposed opposite said first side, said fire rated window arrangement comprising:

a first glass pane being disposed on said first side of said window arrangement;

a second glass pane being disposed on said second side of said window arrangement;

said glass panes being configured to provide said window A q arrangement with a fire rating and thus with the capability to withstand fire a predetermined time with a predetermined fire temperature on said first side of said window arrangement and a predetermined maximum temperature on said second side of said window arrangement;

said first and second glass panes being configured and disposed to form a compartment therebetween;

said compartment being configured and disposed to extend over a substantial portion of said window arrangement;

a fire resistant material being disposed in said compartment;

said fire resistant material comprising a transparent foam to impart to said window arrangement a fire rating and thus with the capability to withstand fire a predetermined time with a predetermined fire temperature on said first side of said window arrangement and a predetermined maximum temperature on said second side of said window arrangement to thus enhance the fire rating capability of said window arrangement to withstand fire and smoke;

a mobile frame;

a fixed frame being configured to support said mobile frame;

said mobile frame and said fixed frame comprising a solid material structure; and at least one of:
  said mobile frame and said fixed frame comprising:
    a hollow profile structure;
    a glass fiber reinforced plastic material to impart to said window arrangement a fire rating and thus with the capability to withstand fire a predetermined time with a predetermined fire temperature on the fire exposed side of said window arrangement and a predetermined maximum temperature on the non-fire exposed side of said window arrangement to thus enhance the fire rating capability of said window arrangement to withstand fire and smoke;

said glass fiber reinforced plastic material being disposed in said hollow profile structure to at least partially fill said hollow profile structure;

said glass fiber reinforced plastic material comprising glass fiber rovings;

said glass fiber rovings being disposed in an axial direction for support in said glass fiber reinforced plastic material;

said hollow profile structure comprising a synthetic/plastic material reinforced in a radial direction with a molded and heat-hardened glass fiber complex, said glass fiber complex comprising glass fibers impregnated with a resin matrix; and said resin matrix comprising: unsaturated polyester resin, at least one hardener, at least one accelerator, additives, color pastes, and fire retarding fillers.

* * * * *

UNITED STATES PATENT AND TRADEMARK OFFICE
CERTIFICATE OF CORRECTION

PATENT NO. : 6,606,831 B2
DATED : August 19, 2003
INVENTOR(S) : Walter Degelsegger It is certified that error appears in the above-identified patent and that said Letters Patent is hereby corrected as shown below:

Column 1,
Line 6, after "No.", delete "PCT/EP00/06193," and insert -- PCT/EP00/06893, --.

Column 3,
Line 4, after the first occurrence of "predetermined", delete "ti" and insert -- time --.
Line 23, after the first occurrence of "predetermined", delete "tie" and insert -- time --.
Line 26, after "of", delete "sad" and insert -- said --.

Column 21,
Line 29, after "transverse", continue on same line with "direction;".
Line 31, after "of:" continue on same line with "said …" to end of line 33.
Line 33, after "frame" insert -- ; --.
Line 48, after "resin" insert -- ; --.

Column 24,
Line 18, after the second occurrence of "a" insert -- building, --.
Line 27, before "arrangement" delete "A q".

Signed and Sealed this

Twentieth Day of January, 2004

JON W. DUDAS
*Acting Director of the United States Patent and Trademark Office*